United States Patent
Patberg

(10) Patent No.: US 7,500,802 B2
(45) Date of Patent: Mar. 10, 2009

(54) THREE-DIMENSIONAL NODE STRUCTURE

(75) Inventor: Lothar Patberg, Aachen (DE)

(73) Assignee: ThyssenKrupp Steel AG, Duisburg (DE)

( * ) Notice: Subject to any disclaimer, the term of this patent is extended or adjusted under 35 U.S.C. 154(b) by 0 days.

(21) Appl. No.: 10/509,587

(22) PCT Filed: Apr. 4, 2003

(86) PCT No.: PCT/EP03/03512

§ 371 (c)(1),
(2), (4) Date: Aug. 22, 2005

(87) PCT Pub. No.: WO03/084800

PCT Pub. Date: Oct. 16, 2003

(65) Prior Publication Data

US 2006/0029462 A1 Feb. 9, 2006

(30) Foreign Application Priority Data

Apr. 9, 2002 (DE) ................ 102 51 442

(51) Int. Cl.
*B62D 21/00* (2006.01)

(52) U.S. Cl. ............ 403/207; 403/176; 403/205; 403/272; 403/382; 403/403; 280/797; 180/311; 296/205

(58) Field of Classification Search ......... 403/176, 403/205, 206, 207, 271, 272, 382, 403; 280/785, 280/793, 794, 795, 797, 800; 180/311; 296/29, 296/205

See application file for complete search history.

(56) References Cited

U.S. PATENT DOCUMENTS

| 809,061 | A | * | 1/1906 | Hoover ............... 403/205 |
| 1,601,140 | A | * | 9/1926 | Murray ............... 280/800 |
| 1,972,309 | A | | 9/1934 | McMurchy |
| 2,193,298 | A | | 3/1940 | Schottenberg et al. |
| 2,387,134 | A | | 10/1945 | Fox |
| 4,694,547 | A | | 9/1987 | Broussard |
| 4,988,230 | A | | 1/1991 | Banthia et al. |
| 5,190,207 | A | * | 3/1993 | Peck et al. ............. 228/170 |
| 5,226,696 | A | | 7/1993 | Klages et al. |
| 5,226,698 | A | | 7/1993 | Harrison |
| 5,332,281 | A | * | 7/1994 | Janotik et al. ........... 296/205 |
| 6,361,244 | B1 | | 3/2002 | Ni et al. |
| 6,539,604 | B2 | | 4/2003 | Patelczyk |
| 2001/0042986 | A1 | | 11/2001 | Patelczyk |
| 2006/0001285 | A1 | | 1/2006 | Patberg |

FOREIGN PATENT DOCUMENTS

| DE | 894508 C | 10/1953 |
| DE | 3726079 A1 | 2/1989 |

(Continued)

*Primary Examiner*—Michael P Ferguson
(74) *Attorney, Agent, or Firm*—Proskauer Rose LLP

(57) ABSTRACT

A three-dimensional joint structure of a support frame for vehicles can include two hollow profiles, of which the first hollow profile has at least one planar side and is cut through around its circumference except for a web lying in this planar side and is bent around this web. The second hollow profile has at least two planar sides that press against the ends of the first hollow profile resulting from the cutting and bending. The two hollow profiles are integrally joined to one another at the edge region of the ends.

9 Claims, 3 Drawing Sheets

FOREIGN PATENT DOCUMENTS

| | | |
|---|---|---|
| DE | 19724037 A1 | 12/1998 |
| DE | 10215441 A1 | 11/2003 |
| EP | 0 478 551 | 4/1992 |
| EP | 0568213 A1 | 11/1993 |
| EP | 0568251 A1 | 11/1993 |
| GB | 668922 A | 3/1952 |
| GB | 1 559 178 | 1/1980 |
| JP | 8061329 | 3/1996 |
| WO | WO03/084802 A1 | 10/2003 |

\* cited by examiner

THREE-DIMENSIONAL NODE STRUCTURE

BACKGROUND OF THE INVENTION

The present invention relates to a three-dimensional joint structure, formed by two hollow profiles, of a support frame for vehicles, and a method for its manufacture.

Joint structures for vehicle support frames are known in different embodiments. A three-dimensional joint, structure having a connecting part for connecting elements of a vehicle support frame is described in EP 0568 213 B1. The connecting part comprises a preferably extruded U-profile having two side plates and a web plate which connects the side plates, in which a support element is laid and bonded thereto through gluing. Essentially cuboid attachment parts are attached to the outsides of one side plate and the web plate, on whose faces further support elements may be placed and glued to the connecting part, so that as a result the support elements may be joined into a stable joint structure having a compact construction. However, this construction has the disadvantage that it requires a further component in the form of the connecting part to connect the support elements, which leads to an undesired increase of the total weight of the support frame.

A support frame for vehicles which comprises multiple assemblies based on hollow profiles is described in EP 0 568 251 B1. The hollow profiles are joined to one another via joint structures of different types in straight or angled positions, preferably perpendicular positions. The connection of profiles positioned perpendicularly to one another, such as the join between the B-column and side sillboard, is implemented via a T-shaped joint structure.

According to one embodiment of such a T-joint, a first hollow profile having a rectangular cross-section has two sections, each bent over by 90° and aligned with one another, having a C-shaped cross-section at one end, on which a second profile may be laid and welded thereto. The three-dimensional frame structure is implemented using two-dimensionally produced joint structures. A three-dimensional joint structure, i.e., the mutual connection of hollow profiles extending in three spatial directions at one point, is not provided in this case.

A joint structure similar to the above-mentioned embodiment of a T-joint is known from DE 37 26 079 A1. In this publication, a door frame construction for utility vehicles, particularly buses, is described. The central component of this construction is a T-joint structure for joining two hollow profiles perpendicularly to one another as components of the door frame. In this case, one of the hollow profiles is cut out lengthwise on diametrically opposing lateral surfaces on its end facing toward the other profile in such a way that two U-shaped attachment parts result, which may be deformed to a desired transition contour and laid on the profile to be attached. Since the door frame is a purely two-dimensional construction, no three-dimensional joint structures are implemented in this case either.

Furthermore, in an application known from practice, hollow profiles bent through hydroforming technology, which have a favorable weight because of the lack of weld flanges, are used to produce a three-dimensional joint structure. However, it has been shown to be problematic in this case that it is not possible to go below a minimum bending radius, so that use in vehicle body regions having tight construction space often does not come into consideration and, in addition, existing weight savings potential remains unused.

Finally, a three-dimensional joint structure comprising two hollow profiles, particularly having a square cross-section, is described in U.S. Pat. No. 1,972,309. To manufacture this joint structure, the first hollow profile is cut out over a specific length except for one remaining side and this side is bent around one of the lengthwise edges of a second hollow profile of identical cross-section positioned perpendicularly to the first hollow profile. The length of the cutout corresponds in this case to twice the edge distance of the hollow profiles, so that the bent side and the ends of the first profile adjoining the cutout completely enclose the four sides of the second hollow profile and press against them in a form-fitting way at the same time. According to an alternative design, the first hollow profile is notched along its four edges over the length cited and cut through centrally around its circumference on three sides in relation to this lengthwise cut. The regions notched on three sides resulting on these sides are bent perpendicularly outward and subsequently the side of the first hollow profile which is not cut through is bent around one lengthwise edge of the second hollow profile in the way described above, the regions bent outward pressing against two of the four sides of the second hollow profile as flanges.

A joint structure constructed in this way provides a high degree of rigidity, but is not variable in regard to the usable profile cross-sections. The length of the cutout and/or the notch of the lengthwise edges must be tailored precisely to the cross-sectional dimensions of the second hollow profile, in order to fulfill the requirement of a form fit, which is necessary for sufficient stability.

SUMMARY OF THE INVENTION

The present invention is thus based on the object of providing a joint structure of the type cited at the beginning, which is distinguished by a compact construction and a low weight with high rigidity.

This object is achieved by a three-dimensional joint structure formed by two hollow profiles, in which the first hollow profile has at least one planar side and is cut through around its circumference in one single plane except for a web lying in the planar side and is bent around this web, and the second hollow profile has at least two directly neighboring planar sides, which press against the ends of the first hollow profile facing toward one another resulting through the cutting and bending, the two hollow profiles being integrally joined to one another at the edge regions of the first hollow profile.

A special advantage of the present invention is that by cutting through the first hollow profile with a subsequent bending operation, an extremely small bending radius may be achieved in comparison to conventional joint structures manufactured using hydroforming, which allows a very compact and thus weight-optimized construction of the joint structure. Simultaneously, very high rigidity is achieved, since the lateral walls of the second hollow profile pressing against the ends of the first hollow profile reinforce the joint structure as bulkhead plates of the first hollow profile. The use of additional reinforcing components in the form of support plates or other things is therefore no longer necessary, which leads to a weight-favorable construction.

In one embodiment of the present invention, the contours of the two hollow profiles press against one another without gaps. Improved distribution of the forces acting on the entire support frame in case of a crash thus results, through which the danger of individual elements of the support frame collapsing is reduced. In particular, the occurrence of punctual load peaks is avoided, since the hollow profiles press against one another in a form-fitting way. Since such three-dimensional joint structures are used especially in the region of the passenger cell, increased protection for the vehicle occupants thus results in case of a crash.

According to a further embodiment of the present invention, the ends of the first hollow profile facing toward one another have projecting edge regions which press against the second hollow profile. These form easily usable attachment zones for joining the two hollow profiles through welding, soldering, or another joining method.

If the joint structure is used in heavily loaded regions of the vehicle support frame, it is expedient for quadrilateral cutouts curved corresponding to the edge radius, which extend over the entire edge radius, to be cut out symmetrically to the separating cut along the separating cut in the region of the edges of the first hollow profile. A notching effect in the corners of the ends of the first hollow profile facing toward one another caused by a load is thus largely avoided. In this context, it has been shown to be especially advantageous if the cut-out cutouts have rounded corners. If the joint structure is used in less loaded regions of the vehicle support frame, this embodiment may be dispensed with for more cost-effective manufacture.

Furthermore, the object specified above is achieved by a method for manufacturing the joint structure according to the present invention having the following steps:

a) cutting through a first hollow profile, having at least one planar side, around its circumference in one single plane except for a web lying in the planar side, b) bending the first, partially cut-through hollow profile around the web lying in the planar side, c) placing the two planar sides of a second hollow profile, which has two directly neighboring planar sides, on the ends of the first hollow profile facing toward one another, which result through the cutting and bending, and d) integrally joining the second hollow profile to the first hollow profile at these edge regions.

Through the bending of the first hollow profile, the geometry of the three-dimensional joint structure may be tailored to the spatial requirements of the user without excess outlay for manufacturing technology. In this case, the angle between the two planar sides of the second hollow profile must correspond to the bending angle in order to allow the two hollow profiles to press against one another without a gap as much as possible.

According to a further embodiment of the method, before the cutting, the first hollow profile is deformed around its circumference except for a web lying in the planar side and the separating cut is laid centrally through the deformation. Projecting edge regions may thus be produced on the ends of the first hollow profile facing toward one another with the aid of the cutting procedure, which press flat against the planar sides of the second profile and provide favorable geometric relationships for the integral joining of the two hollow profiles and thus also in regard to their carrying capacity. The deformation is preferably introduced into the first hollow profile by hydroforming.

According to a further advantageous embodiment of the method, the first hollow profile is cut by laser beam cutting. This allows precisely cut edges, through which the integral joining of the hollow profiles is also made easier.

The hollow profiles may be joined by welding or soldering, the use of laser beams for welding or soldering again having been shown to be especially advantageous.

BRIEF DESCRIPTION OF THE DRAWING

In the following, the present invention will be explained on the basis of a drawing illustrating an exemplary embodiment.

DETAILED DESCRIPTION OF THE INVENTION

Figure 1:
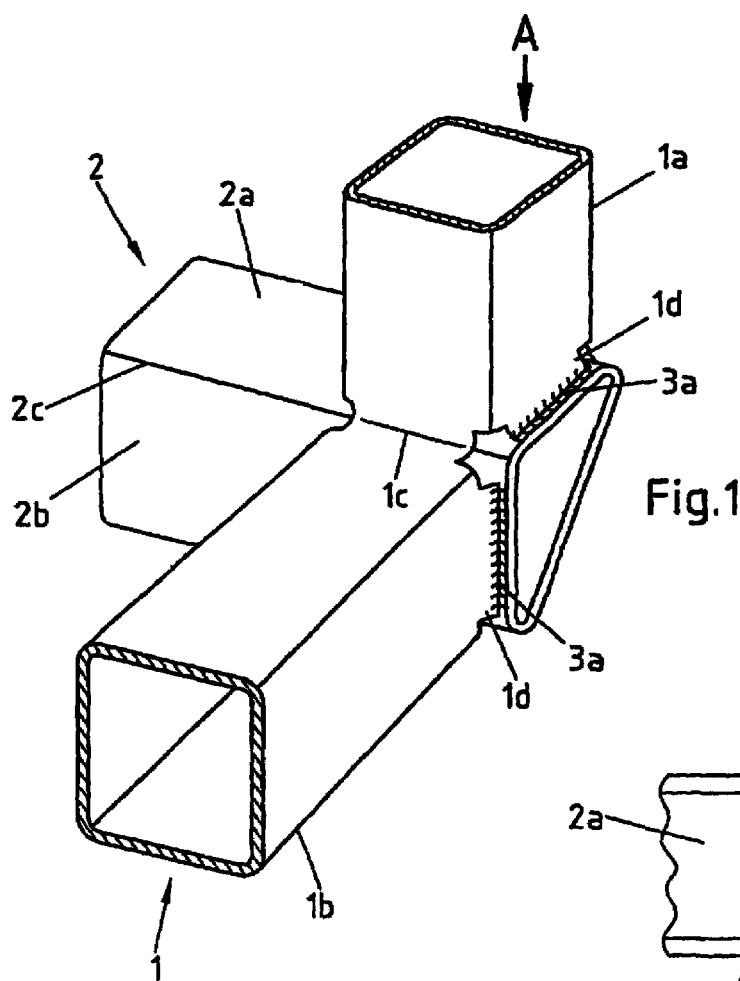
FIG. 1 shows a three-dimensional joint structure of a support frame for motor vehicles made of hollow profiles in a perspective view.

The three-dimensional joint structure illustrated in FIG. 1 comprises two hollow profiles 1, 2, which together form the shape of a tripod and are integrally joined to one another. The first hollow profile 1, which has an essentially square cross-section, is cut through around its circumference except for a web 1c and bent around the web 1c, so that two ends 1a, 1b of the hollow profile 1 facing toward one another result. The second hollow profile 2 has a cross-section in the form of an equilateral triangle and its leg sides 2a, 2b press against the ends 1a, 1b of the first hollow profile 1. In this case, the angle between the leg sides 2a, 2b corresponds to the bending angle, so that the leg sides 2a, 2b press against the faces of the ends 1a, 1b of the hollow profile 1 without a gap as much as possible.

The two ends 1a, 1b of the hollow profile 1 have bent-over edge regions 1d, 1e, 1f along their separating cut, which press against the leg sides 2a, 2b of the hollow profile 2. The front end of the hollow profile 2 terminates almost flush with the bent-over edge region 1d of the ends 1a, 1b, from which the cited shape of a tripod results. An extension beyond the hollow profile 1 is conceivable, however. The two ends 1a, 1b of the hollow profile 1 are joined at their bent-over edge regions 1d, 1e, 1f to the leg sides of the second profile via weld seams 3a, 3b, 3c. The shared edge 2c of the leg sides 2a, 2b of the hollow profile 2 is connected to the web 1c of the hollow profile 1 via a weld seam 3d.

Figure 2:
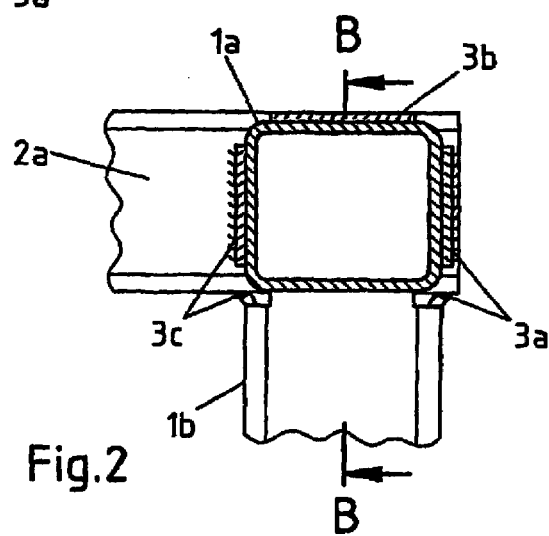
FIG. 2 shows a joint structure of FIG. 1 in a top view from the viewpoint of the arrow A in FIG. 1.
Figure 4:
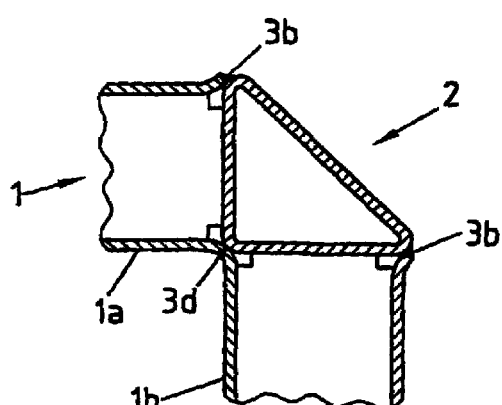
FIG. 4 shows the joint structure of FIG. 1 in the cross-section along line B-B of FIG. 2, FIGS. 5a-e show the method steps for manufacturing the joint structure of FIG. 1.
Figure 3:
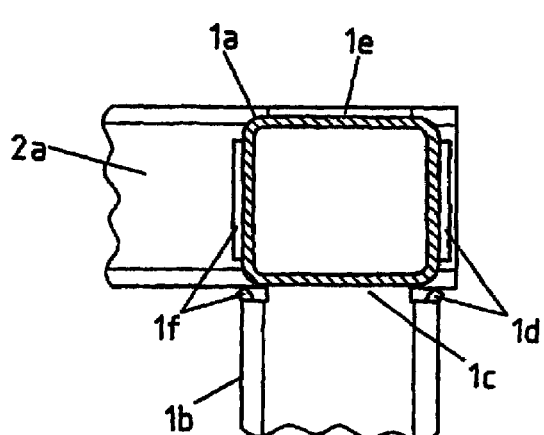
FIG. 3 shows the joint structure of FIG. 1, with the weld seams left out, from the viewpoint of the arrow A in FIG. 1.

FIGS. 2 and 3 show the joint structure in a top view, the weld seams not being illustrated in FIG. 2 for reasons of clarity.

Figure 5A:
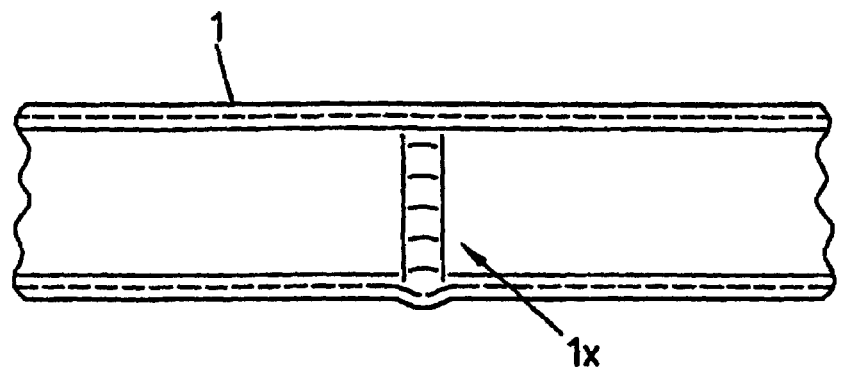
Figure 5B:
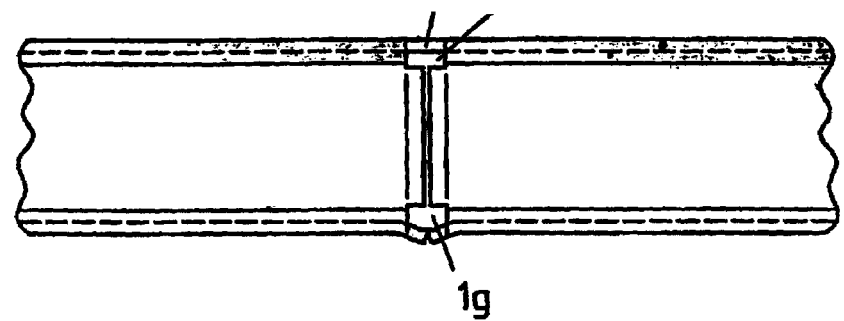
Figure 5C:
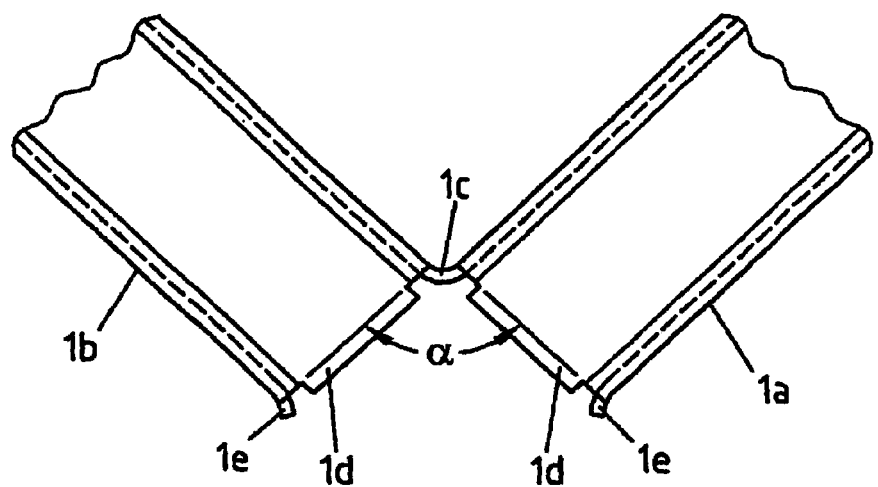
Figure 5D:
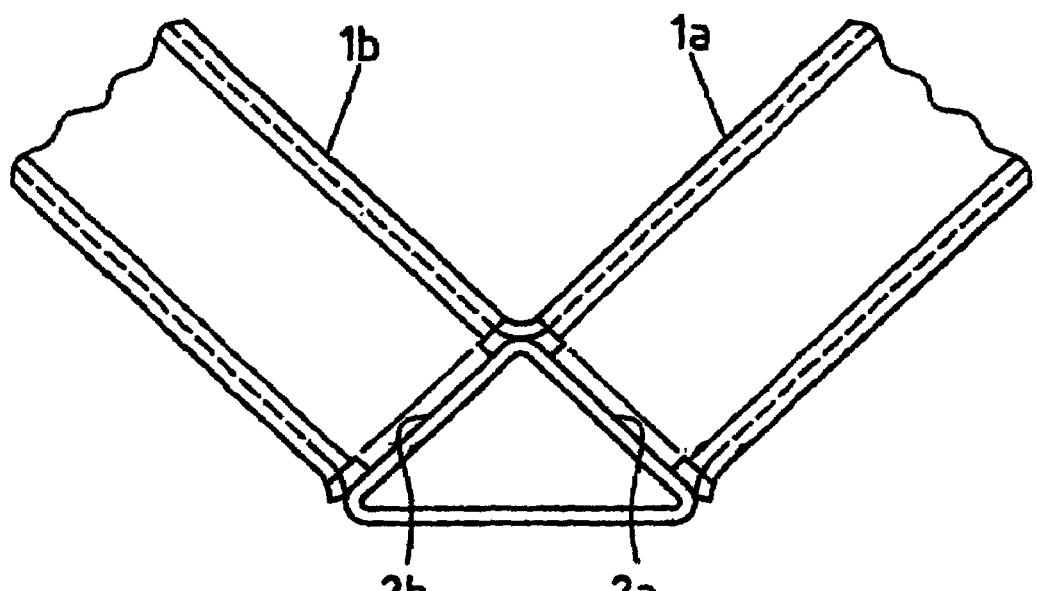
Figure 5E:
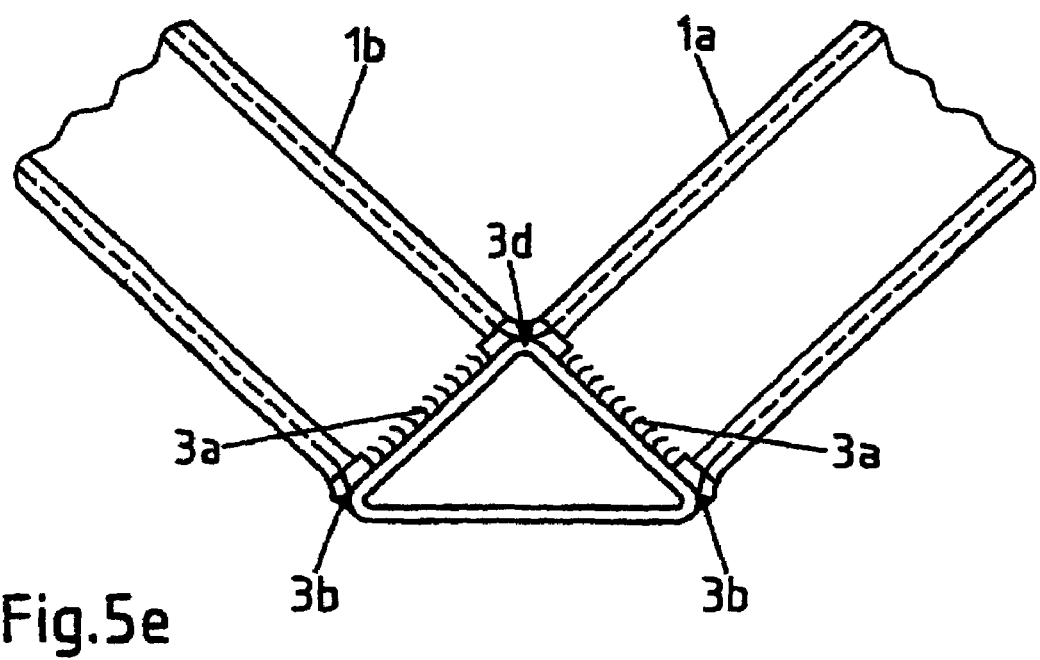
Figure 5A:
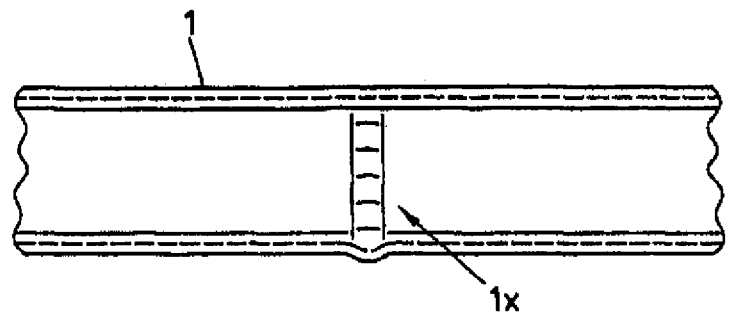
Figure 5B:
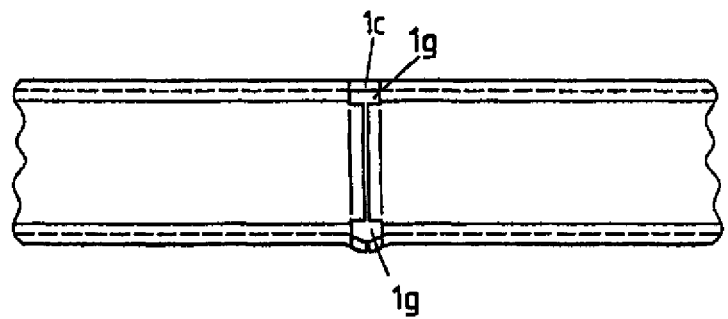
Figure 5C:
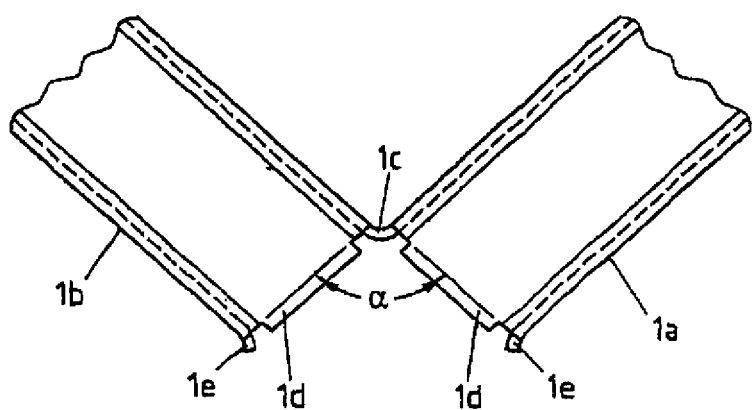

The individual method steps for manufacturing the joint structure are illustrated in FIGS. 5a-e. As shown in FIG. 5a, first a deformation 1x is introduced into three sides of the hollow profile 1 around its circumference using hydroforming. The hollow profile 1 is then cut along the middle of the deformation 1x, preferably through laser beam cutting, except for a web 1c in the non-deformed fourth side (FIG. 5b). In this case, the cutting tool is guided in such a way that in the region of the edges of the hollow profile (1), quadrilateral cutouts (1g) curved corresponding to the edge radius, which extend over the entire edge radius, are cut out symmetrically to the separating cut. Edge regions 1d, 1e, 1f projecting along the separating cut are thus produced. Subsequently, the hollow profile 1 is bent around the web 1c by the bending angle α (FIG. 5c). In a next step, the leg sides 2a, 2b of the hollow profile 2, whose enclosed angle corresponds to the bending angle α, are placed on the ends 1a, 1b of the hollow profile 1 (FIG. 5d), so that the projecting edge regions 1d, 1e, 1f all press against the leg sides 2a, 2b. In a final step shown in FIG. 5e, the ends 1a, 1b of the hollow profile 1 are welded to the leg sides 2a, 2b of the hollow profile 2 at the projecting edge regions 1d, 1e, 1f. In addition, the web 1c is welded to the shared edge 2c of the leg sides 2a, 2b.

The invention claimed is:

1. A three-dimensional joint structure made of two hollow profiles, of a support frame for vehicles, comprising:

a first elongated hollow profile having a cross-section having at least one planar side and a separating cut extending in one single cross-sectional plane around a portion of the circumference of the first hollow profile to define a web lying on the planar side, the first hollow profile being bent around the web to define two profile sections at an angle relative to one another and connected by the web, the two profile sections having ends formed by the separating cut and each end comprising projecting edge regions; and a second elongated hollow profile having a cross-section having at least two directly neighboring planar sides, which press against the projecting edge regions of the two profile sections, the first and second hollow profiles being integrally joined to one another between the projecting edge regions of the two profile sections of the first elongated hollow profile and the two neighboring planar sides of the second hollow profile, wherein the projecting edge regions of the first hollow profile are formed by quadrilateral cutouts cut along the separating cut and disposed symmetrically to the one single cross-sectional plane, and wherein each cutout is located and shaped to correspond to a location and radius of a longitudinal edge of the first hollow profile and to extend over the entire edge.

2. The joint structure according to claim 1, wherein contours of the two hollow profiles press against one another without gaps.

3. The joint structure according to claim 1, wherein the cutouts have rounded corners.

4. A method for manufacturing a joint structure according to claim 1, comprising the following method steps:

a) cutting through a first elongated hollow profile having a cross-section having at least one planar side around a portion of the circumference of the first hollow profile in one single cross-sectional plane to define a web lying on the planar side, b) bending the first, partially cut-through hollow profile around the web lying on the planar side to define two angled profile sections connected by the web, the profile sections having ends formed by the separating cut and each end comprising projecting edge regions, c) placing two directly neighboring planar sides of a second elongated hollow profile on the projecting edge regions of the two profile sections, and d) integrally joining the second hollow profile to the first hollow profile between the projecting edge regions and the neighboring planar sides of the second hollow profile, wherein the projecting edge regions of the first hollow profile are formed by quadrilateral cutouts cut along the separating cut and disposed symmetrically to the one single cross-sectional plane, and wherein each cutout is located and shaped to correspond to a location and radius of a longitudinal edge of the first hollow profile and to extend over the entire edge.

5. The method according to claim 4, wherein, before the cutting, the first hollow profile is deformed around its circumference to define the web lying on the planar side and the separating cut is laid through the middle of the deformation.

6. The method according to claim 5, wherein the deformation is introduced into the first hollow profile through hydroforming.

7. The method according to claim 4, wherein the first hollow profile is cut through laser beam cutting.

8. The method according to claim 4, wherein the hollow profiles are joined by welding or soldering.

9. The method according to claim 8, wherein the welding or soldering is performed using laser beams.

* * * * *

UNITED STATES PATENT AND TRADEMARK OFFICE
CERTIFICATE OF CORRECTION

PATENT NO. : 7,500,802 B2
APPLICATION NO. : 10/509587
DATED : March 10, 2009
INVENTOR(S) : Lothar Patberg It is certified that error appears in the above-identified patent and that said Letters Patent is hereby corrected as shown below:

In the Drawings

Delete Drawing Sheet 2 of 3, and substitute the attached drawing sheet containing Figs. 5A-5C.

Signed and Sealed this

Thirtieth Day of June, 2009

JOHN DOLL
*Acting Director of the United States Patent and Trademark Office*